United States Patent Office 2,837,506
Patented June 3, 1958

2,837,506

POLYMERIZATION OF CHLOROPRENE

Arthur F. Myers, Louisville, Ky., and Jack Raymond Hively, Clarksville, Ind., assignors to E. I. du Pont de Nemours & Company, Wilmington, Del., a corporation of Delaware No Drawing. Application January 26, 1956
Serial No. 561,672

1 Claim. (Cl. 260—92.3)

This invention relates to the polymerization of chloroprene, and more particularly to a method of preventing the formation and growth of the granular (popcorn) polymer during the polymerization of chloroprene in aqueous emulsion, either in the liquid or vapor phase. The granular or popcorn polymer is an insoluble, self-propagating type of polymer known as omega polymer (Carothers et al., J. A. C. S. 53, 4205 (1931)).

The formation of granular polymers has furnished serious difficulties ever since polymerizable compounds such as chloroprene, butadiene and styrene were first handled on a commercial scale, by forming extremely troublesome deposits in storage tanks, pipelines, stills, etc., in which the monomer is present in either liquid or vapor phase. These granual polymers are self-propagating, that is, they initiate the formation of more granular polymers. Thus, masses of the polymer, once formed, continue to grow at an ever-increasing rate, and minute particles of the polymer (seeds) may be carried from one part to another of the equipment and start polymerization wherever they are carried. The formation of these polymers first interferes with flow through pipes and with the operation of such devices as rupture disks, but will finally fill the whole of the equipment in which the monomer is held, and their growth does not stop until all of the monomer is used. Since the formation of the granular polymer takes place with an over-all increase in volume, equipment has even been ruptured by the polymer formed therein.

The special problem with which this invention is concerned is the formation of the granular polymer in the system used for the formation of the commercial polychloroprene synthetic rubbers (neoprenes) in aqueous emulsion. The formation of granular polymer is particularly troublesome when the polymerization is carried out continuously, since the apparatus must remain full of emulsion and unopened for long periods of time, thus allowing the granular polymer to continue its growth inside the equipment. Also, the apparatus is necessarily much more complicated, involving much piping which is difficult to clean and requiring the exposure to chloroprene of surfaces of stainless steel, lead, and particularly asbestos, paper, and similar porous materials used in gaskets, seals and packing. Such porous surfaces are particularly active in the formation of the granular polymer. Thus, thorough cleaning is often impractical, and frequent replacement of gaskets and packing is expensive. It is often necessary, for example, to shut down after 24 hours due to plugging of lines, usually in the vicinity of the gaskets. Methods which are useful for controlling the formation of the granular polymer during its distillation and storage, such as adding certain polymerization inhibitors, cannot be used in this process because such agents interfere with the polymerization of the chloroprene to the desired rubber-like polymer.

It is therefore an object of the present invention to provide a simple and economical method for treating any material that initiates popcorn polymer formation with which the chloroprene comes in contact during polymerization, so that such material is rendered inactive. It is a more specific object of the invention to prevent the growth of the granular or popcorn polymer in chloroprene by coating gaskets and other surfaces, which appear to initiate the growth of popcorn polymer, with sulfur to prevent the initiation of the popcorn growth.

It has now been found that the initiation and growth of granular polymers during emulsion polymerization of chloroprene can be effectively inhibited or prevented by coating the surfaces of the apparatus employed, where initiation of popcorn polymer growth appears to take place, with sulfur.

The sulfur may be applied as such or mixed as the major component with coating compositions suitable for use in the chloroprene system, such as gasket cements. An effective procedure for relatively small articles such as gaskets is to dip them into molten sulfur, then drain and cool the coated gaskets. Pipe sections and hollow articles in general may be coated by heating and turning so as to distribute a coating of molten sulfur uniformly over the interior. Liquid sulfur may also be applied by painting or spraying.

The sulfur treatment may be applied to any type of surface with which the chloroprene emulsion normally comes in contact. Examples are glass, steel, lead, asbestos, cloth, paper, synthetic resins and graphite. The sulfur treatment is effective for any type of chloroprene emulsion used for the production of rubber-like polymers, but is particularly effective when the emulsion contains no sulfur. Chloroprene emulsions containing sulfur also produce granular polymers to a serious extent, and this difficulty is controlled by the sulfur treatment of this invention although the overall effect is less marked.

Contrary to expectation, the sulfur dissolves only very slowly from the coated surfaces into the chloroprene emulsion. The solution is particularly slow from the coatings on the porous surfaces which appear to initiate the granular polymer formation. Accordingly, the sulfur coating is effective for long periods. Again, the solution of the sulfur is so slow that not enough sulfur is dissolved by the chloroprene emulsion as it flows past or over the coated surfaces, to produce any undesirable effect upon the rate of polymerization or upon the properties of the rubber-like polymer formed. Also contrary to expectation, the emulsifying systems generally used for emulsifying the chloroprene have no apparent effect in removing the sulfur coatings.

The following examples are given to illustrate the invention:

Asbestos gaskets for use in joining sections of pipe were dipped in molten sulfur (kept below 160° C.) for 10 minutes. After removal from the bath, the excess sulfur was then allowed to drain off before solidification. Various glass fittings, through which chloroprene emulsion passed in a continuous emulsification polymerization, were painted on the inside with molten sulfur. These fittings and gaskets were used in assembling a continuous emulsion polymerization system in which the emulsion at 40° C. flowed through a series of polymerization vessels with glass pipes and fittings for the connections. This equipment was operated continuously for four days and then taken down for inspection. No granular (popcorn) polymer had formed and sulfur still remained on the glass fittings and gaskets. In the same period of time, the lines of the same equipment without any sulfur treatment became plugged with granular polymer.

The same equipment was then assembled, using sulfur-treated gaskets as the only sulfur-treated parts. At the end of 20 days there was no significant amount of granular polymer found in the equipment. The same equipment was also assembled, using new sulfur-treated gaskets but without cleaning the piping, and was run for another 20 days without any noticeable popcorn polymer formation. This was repeated twice (total operation about 80 days), still without material popcorn polymer formation. No effect on the rate of polymerization or the nature of the elastomer formed was caused by the sulfur-treated surfaces.

This series of tests shows that the sulfur coating effectively inhibits or prevents the formation of popcorn polymer in the emulsion polymerization system for long periods of time. It further shows that good protection against popcorn formation may be obtained by coating with sulfur only those surfaces on which the popcorn polymer is normally most apt to form.

We claim:
The process of inhibiting the formation of granular polymers of chloroprene upon surfaces exposed to an aqueous emulsion of chloroprene and to chloroprene vapor without inhibiting the normal polymerization of the chloroprene, which surfaces tend to initiate the formation of popcorn polymer, which comprises coating such surfaces with sulfur.

References Cited in the file of this patent
UNITED STATES PATENTS

| | | |
|---|---|---|
| 1,694,730 | Bleecker | Dec. 11, 1928 |
| 2,166,125 | Britton et al. | July 18, 1939 |
| 2,188,772 | Dreisbach et al. | Jan. 30, 1940 |
| 2,240,764 | Dreisbach et al. | May 6, 1941 |
| 2,459,760 | O'Donnell | Jan. 18, 1949 |